(12) United States Patent
Aronowitz

(10) Patent No.: US 8,554,562 B2
(45) Date of Patent: *Oct. 8, 2013

(54) METHOD AND SYSTEM FOR SPEAKER DIARIZATION

(75) Inventor: Hagai Aronowitz, Petah-Tikva (IL)

(73) Assignee: Nuance Communications, Inc., Burlington, MA (US)

( * ) Notice: Subject to any disclaimer, the term of this patent is extended or adjusted under 35 U.S.C. 154(b) by 991 days.

This patent is subject to a terminal disclaimer.

(21) Appl. No.: 12/618,731

(22) Filed: Nov. 15, 2009

(65) Prior Publication Data

US 2011/0119060 A1    May 19, 2011

(51) Int. Cl.
G10L 15/00 (2013.01)
G10L 17/00 (2013.01)

(52) U.S. Cl.
USPC ........... 704/250; 704/245; 704/246; 704/247; 704/248

(58) Field of Classification Search
USPC .................................. 704/246–248, 250, 245
See application file for complete search history.

(56) References Cited

U.S. PATENT DOCUMENTS

| | | | |
|---|---|---|---|
| 5,598,507 A | | 1/1997 | Kimber et al. |
| 5,897,616 A | | 4/1999 | Kanevsky et al. |
| 6,067,517 A | * | 5/2000 | Bahl et al. .................. 704/256.4 |
| 6,421,645 B1 | * | 7/2002 | Beigi et al. ..................... 704/272 |
| 6,424,946 B1 | * | 7/2002 | Tritschler et al. ............. 704/272 |
| 7,024,359 B2 | * | 4/2006 | Chang et al. .................. 704/251 |
| 7,266,189 B1 | | 9/2007 | Day |
| 7,424,427 B2 | * | 9/2008 | Liu et al. ..................... 704/256.1 |
| 7,716,048 B2 | * | 5/2010 | Pereg et al. .................... 704/246 |
| 7,991,619 B2 | * | 8/2011 | Chaudhari et al. ............. 704/278 |
| 2003/0182118 A1 | * | 9/2003 | Obrador et al. ............... 704/246 |
| 2007/0071206 A1 | | 3/2007 | Gainsboro et al. |
| 2009/0147995 A1 | | 6/2009 | Sawada et al. |

FOREIGN PATENT DOCUMENTS

EP    1662483    5/2006

OTHER PUBLICATIONS

Zhu et al "Combining Speaker Identification and BIC for Speaker Diarization;" Interspeech 2005.*
Aronowitz, H. "Segmental Modeling for Audio Segmentation." ICASSP 2007.*
Wilcox, L. et al. "Segmentation of Speech Using Speaker Identification." Xerox PARC, Palot Alto, CA, IEEE, 1994. pp. I161-I164.*
S. S. Chen and P. S. Gopalakrishnam, "Speaker, Environment and Channel Change Detection and Clustering via the Bayesian Information Criterion," in Proc. DARPA Broadcast News Transcription and Understanding Workshop, 1998.
H. Gish, M. Siu, R. Rohlicek, "Segregation of speakers for speech Recognition and Speaker Identification," in Proc. ICASSP, 1991.

(Continued)

*Primary Examiner* — Talivaldis Ivars Smits
*Assistant Examiner* — Shaun Roberts
(74) *Attorney, Agent, or Firm* — Sunstein Kann Murphy & Timbers LLP

(57) ABSTRACT

A method and system for speaker diarization are provided. Pre-trained acoustic models of individual speaker and/or groups of speakers are obtained. Speech data with multiple speakers is received and divided into frames. For a frame, an acoustic feature vector is determined extended to include log-likelihood ratios of the pre-trained models in relation to a background population model. The extended acoustic feature vector is used in segmentation and clustering algorithms.

15 Claims, 4 Drawing Sheets

(56) References Cited

OTHER PUBLICATIONS

C. Barras, X. Zhu, S. Meignier, J. L. Gauvain, "Improving Speaker Diarization," in Proc. DARPA RT04, 2004.

D. A. Reynolds and P. Torres-Carrasquillo, "The MIT Lincoln Laboratory RT-04F Diarization Systems: Applications to Broadcast Audio and Telephone Conversations," in Proc. DARPA RT04, 2004.

M. Collet, D. Charlet, F. Bimbot, "Speaker tracking by anchor models using speaker segment cluster information" in Proc. ICASSP, 2006.

H. Aronowitz, "Trainable speaker diarization", in proc. Interspeech, 2007.

Scott Otterson, "Use of speaker location features in meeting diarization", A dissertation Submmited in Partial Fulfillments of the Requirements for the degree of Doctor of Philosophy, University of Washington, 2008.

Jing Huang, "The IBM RT07 evaluation systems for speaker diarization on lecture", IBM Thomas J. Watsom Research Center, Yorktown Heights NY 10598, U.S.A.

H. Aronowitz, "Speaker recognition in two-wire test sessions", IBM Haifa Research Labs, Haifa 31905, Israel.

Jing Huang, "The IBM RT07 Evaluation Systems for Speaker Diarization on Lecture Meetings", Multimodal Technologies for Perception of Humans Lecture Notes in Computer Science, vol. 4625, pp. 497-508, 2008.

Aronowitz and Solewicz, "Speaker Recognition in Two-Wire Test Session", in Proc. Interspeech 2008, Brisbane, Australia, pp. 865-868, Sep. 2008.

* cited by examiner

METHOD AND SYSTEM FOR SPEAKER DIARIZATION

FIELD OF THE INVENTION

This invention relates to the field of speaker diarization. In particular, the invention relates to speaker diarization based on known speaker models.

BACKGROUND OF THE INVENTION

Speaker diarization is the process of segmenting an audio stream or audio document into speaker homogenous segments and clustering segments according to speaker identity.

Speaker diarization is a key component for indexing audio archives and as part of a transcription system. Speaker diarization can be used for other tasks such as diarization of telephone conversations and meetings, broadcast processing and retrieval, 2-wire telephony processing, etc.

A speaker diarization system usually consists of a speech/non-speech segmentation component, a speaker segmentation component, and a speaker clustering component.

In known systems, an acoustic feature vector is extracted for each frame of input audio data. The acoustic feature vector is produced using standard signal processing techniques that represent the spectral character of speech.

Speaker segmentation is the process of identifying change points in an audio input where the identity of the speaker changes. Segment clustering is the process of clustering segments according to speakers' identities. Speaker segmentation algorithms and segment clustering algorithms process the acoustic feature vectors of the frames of input audio data.

The current approach for speaker diarization is a 'blind' algorithm that assumes no prior knowledge on the speakers, and applies the segmentation and clustering using the statistical distribution of acoustic spectral features.

SUMMARY OF THE INVENTION

According to a first aspect of the present invention there is provided a method for speaker diarization, comprising the steps of: obtaining pre-trained acoustic models of individual speakers and/or groups of speakers; receiving speech data with multiple speakers; dividing the speech data into frames; and for a frame, determining an acoustic feature vector extended to include log-likelihood ratios of the pre-trained models in relation to a background population model; wherein said steps are implemented in either of: a) computer hardware configured to perform said steps, or b) computer software embodied in a non-transitory, tangible, computer-readable storage medium.

According to a second aspect of the present invention there is provided a method of providing a service to a customer over a network, the service comprising: obtaining pre-trained acoustic models of individual speakers and/or groups of speakers; receiving speech data with multiple speakers; dividing the speech data into frames; and for a frame, determining an acoustic feature vector extended to include log-likelihood ratios of the pre-trained models in relation to a background population model; wherein said steps are implemented in either of: a) computer hardware configured to perform said steps, or b) computer software embodied in a non-transitory, tangible, computer-readable storage medium.

According to a third aspect of the present invention there is provided a computer program product for speaker diarization, the computer program product comprising: a computer readable medium; computer program instructions operative to: obtain pre-trained acoustic models of individual speakers and/or groups of speakers; receive speech data with multiple speakers; divide the speech data into frames; for a frame, determine an acoustic feature vector extended to include log-likelihood ratios of the pre-trained models in relation to a background population model; wherein said program instructions are stored on said computer readable medium.

According to a fourth aspect of the present invention there is provided a system for speaker diarization, comprising: a processor; a storage medium storing pre-trained acoustic models of individual speakers and/or groups of speakers; a receiver for speech data with multiple speakers; a dividing component for dividing the speech data into frames; and a frame pre-processing component for determining an extended acoustic feature vector including log-likelihood ratios of the pre-trained models in relation to a background population model; wherein any of said receiver, dividing component, and pre-processing component are implemented in either of computer hardware or computer software and embodied in a non-transitory, tangible, computer-readable storage medium.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
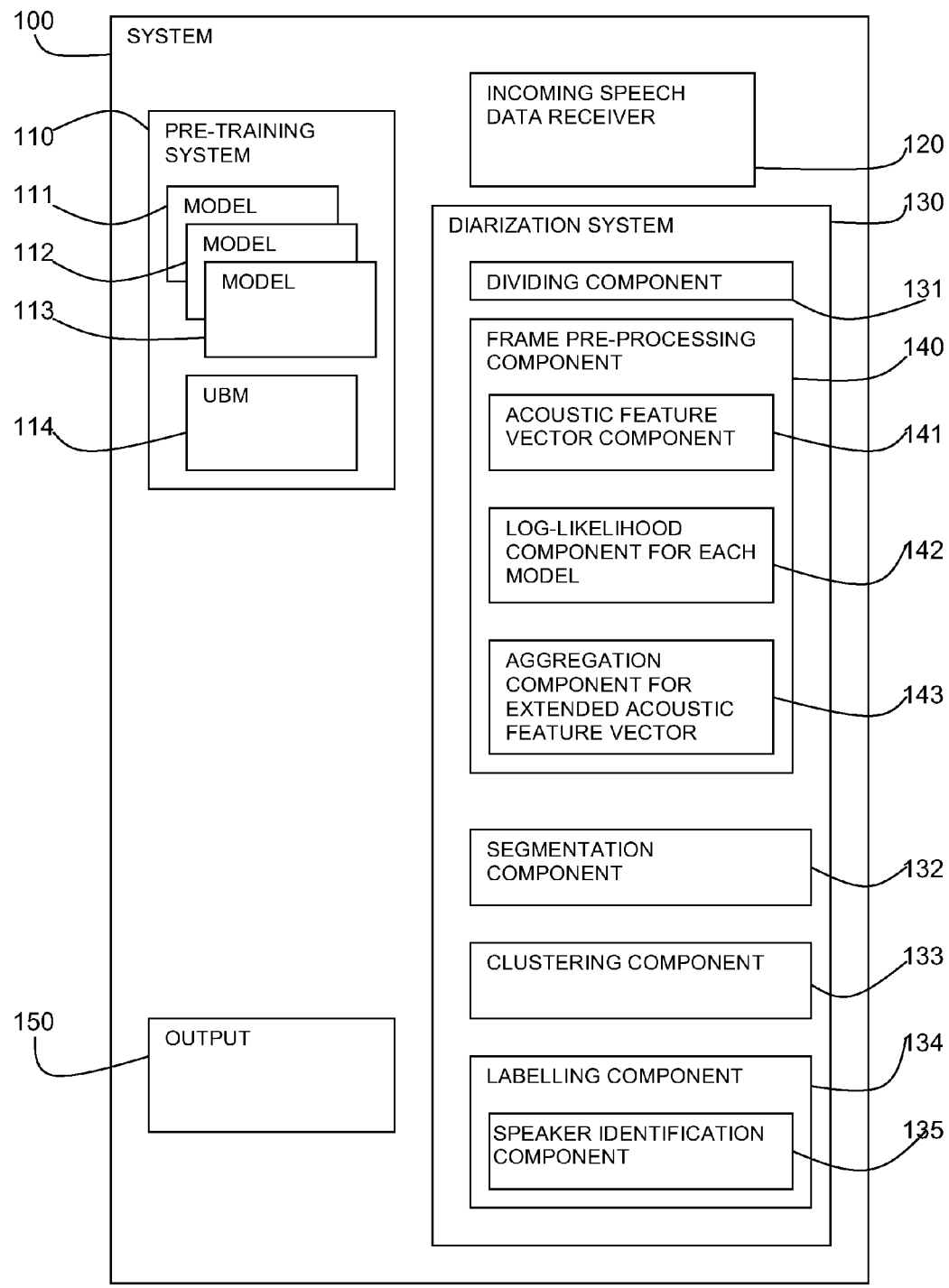
FIG. 1 is a block diagram of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Speaker diarization methods can be summarized in the following steps:

Process an input signal by computing an acoustic feature vector based on spectral characteristics every frame or time period (for example, every 10 msec);

Segment the input signal by finding time frames of speaker changes using statistical measures of distances between distributions of feature vectors;

Cluster resulting segments using the feature vectors.

In real life applications, often the possible identities of at least some of the speakers may be known in advance. For example, in personal systems, the identity of the owner, who usually is one of the speakers, is known in advance. In another example, in a contact-center domain the identity of the agent is known but not the client. In these cases, it is possible to pre-train an acoustic model for some of the speakers.

Given prior information such as acoustic models for some of the possible speakers, this information is fed, together with the original raw acoustic features, and is used as input for the segmentation and clustering algorithms.

A pre-processing is described in which the acoustic feature vector is extended to include a probability that a speaker in a frame is one of the speakers or group of speakers of a pre-trained model.

The described method and system modify any available speaker diarization system that uses acoustic vectors by extending the acoustic feature vectors with log-likelihood ratios. This may be applied at the speaker-change detection stage and the clustering stage. The log-likelihoods may use either specific speaker models or models for groups of speakers.

In the described method and system, it is assumed that a set of pre-trained k-speakers or groups of speakers is provided and every speech frame is parameterized by not only the acoustic vectors but also on the log-likelihood ratios for each of the k-speakers.

In statistics, a likelihood ratio test is used to compare the fit of two models one of which is nested within the other. Both models are fitted to the data and their log-likelihood recorded. In this case, the fit of a model of a known speaker or group of speakers is compared to the fit of a background model of the speaker population.

A log-likelihood ratio (LLR) is defined as follows:

Let Si denote a pre-trained model #i for a known speaker or a subset of the speaker population.

UBM is a Universal Background Model modeling the entire speaker population (trained on a large set of development speakers).

Given an acoustic feature vector Xt, the LLR is defined as:

$$LLRi = \log Pr(Xt|Si) - \log(Pr(Xt|UBM)).$$

The described method extends the acoustic vector Xt with the LLRs:

$$Xt\_new = [Xt, LLR1, \ldots, LLRn] \text{ when n is the number of pre-trained models.}$$

If none of the k-speakers exists in the speech stream, then the k log-likelihoods tend to distribute as white-noise and are cancelled out in the statistical distance metrics used by the change-detection and clustering algorithms. However, when one or more of the k-speaker set does appear in the speech stream, the distribution of the log-likelihood for that speaker tends to be very different in segments that belong to the speaker compared to other speakers.

Referring to FIG. 1, a system 100 is shown for speaker diarization. A pre-training system 110 is provided for modeling known speakers or groups of speakers 111, 112, 113. A background population model 114 is provided such as a universal background model (UBM).

The pre-training system 110 may model individual speakers or a sub-set of the speaker population is such as "males", "speakers in noisy background", "females using a distant microphone" etc.

In an example implementation, the speakers are trained using Gaussian Mixture Models (GMMs). For each speaker, a time series of mel-frequency cepstrum coefficient (MFCC) vectors is extracted from the audio and is modelled using a Gaussian Mixture Model. There is a standard approach of how to train these models described in "Speaker Verification Using Adapted Gaussian Mixture Models" by Douglas A. Reynolds, Thomas F. Quatieri, and Robert B. Dunn, *Digital Signal Processing* Vol. 10, Nos. 1-3, January 2000. The system is built around the likelihood ratio test for verification, using GMMs for likelihood functions, a UBM for alternative speaker representation, and a form of Bayesian adaptation to derive speaker models from the UBM.

A UBM is generated by a GMM modelled to represent a large population of speakers. The training is done using a clustering algorithm using the EM (Expectation Maximization) principle.

A subset of speakers is selected according to prior information on the task and available training audio. For example, if it is known that a certain speaker is likely to be one of the speakers in the conversation, and if there is available training audio for that speaker, a model is trained for the speaker.

Another example is training one model for males and one model for females. A further example is that if it is likely that some of the speakers are recorded in a quiet environment and some of the speakers are recorded in a noisy environment, one model can be trained for a large set of speakers recorded in a quiet environment, and another model can be trained for a large set of speakers recorded in a noisy environment (or the noise can be artificially added to the audio and then a model trained).

The system 100 includes a receiver 120 for incoming data in the form of a stream of audio data including data from multiple speakers.

A diarization system 130 includes a dividing component 131 which divides the incoming stream into frames. The incoming speech is divided into a sequence of evenly spaced overlapping frames or windows of short duration (for example, 10, 15 or 20 ms).

In known systems, an acoustic feature vector is used to represent the spectral characteristics of the audio in the specific window or frame. MFC (mel-frequency cepstrum) is a standard approach for a spectral representation. In sound processing, the mel-frequency cepstrum (MFC) is a representation of the short-term power spectrum of a sound, based on a linear cosine transform of a log power spectrum on a non-linear mel scale of frequency.

In the described system, a frame pre-processing component 140 is provided including an acoustic feature vector component 141 for processing a frame to obtain an acoustic feature vector for the frame.

The pre-processing component 140 also includes a log-likelihood component 142 for processing a frame for a pre-trained model 111-113 of speakers or groups of speakers to obtain a probability that the frame belongs to the model compared to a background population model 114.

The pre-processing component 140 also includes an aggregation component 143 which extends the acoustic feature vector to add the coefficients for each of the log-likelihoods of the pre-trained models.

Each frame is input into the pre-processing component 140 which outputs an extended acoustic feature vector for the frame, with coefficients giving a value of log-likelihood for each of the pre-trained models.

The extended acoustic feature vector is used in a segmentation component 132 which uses known methods to identify frames which belong to the same speaker segment.

The extended acoustic feature vector is also used in a clustering component 133 which uses known methods to cluster segments as belonging to the same speaker.

A labeling component 134 may be provided to label segments according to an identified speaker. A speaker identification component 135 carries out speaker identification using the pre-trained models 111-113 to identify the speaker of segments or clusters.

An output 150 outputs the speech data with speaker identification in the form of a label identifying the speaker for the segments. The speaker labels may be relative labels such as "the first speaker in the conversation", etc.

Figure 2:
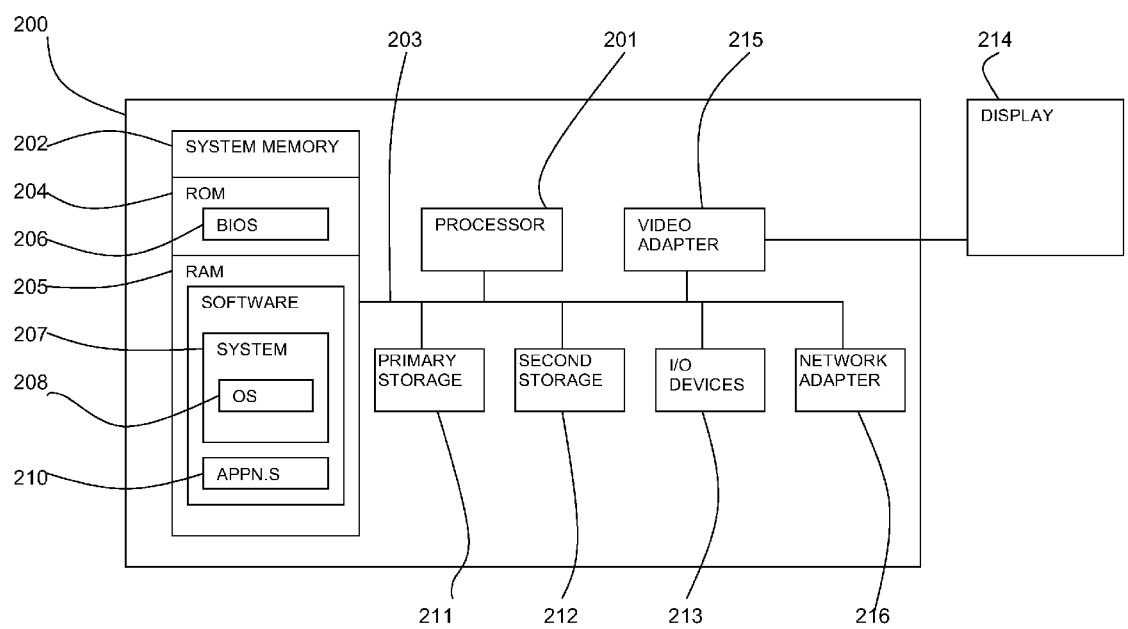
FIG. 2 is a block diagram of a computer system in which the present invention may be implemented.

Referring to FIG. 2, an exemplary system for implementing a speaker diarization system includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
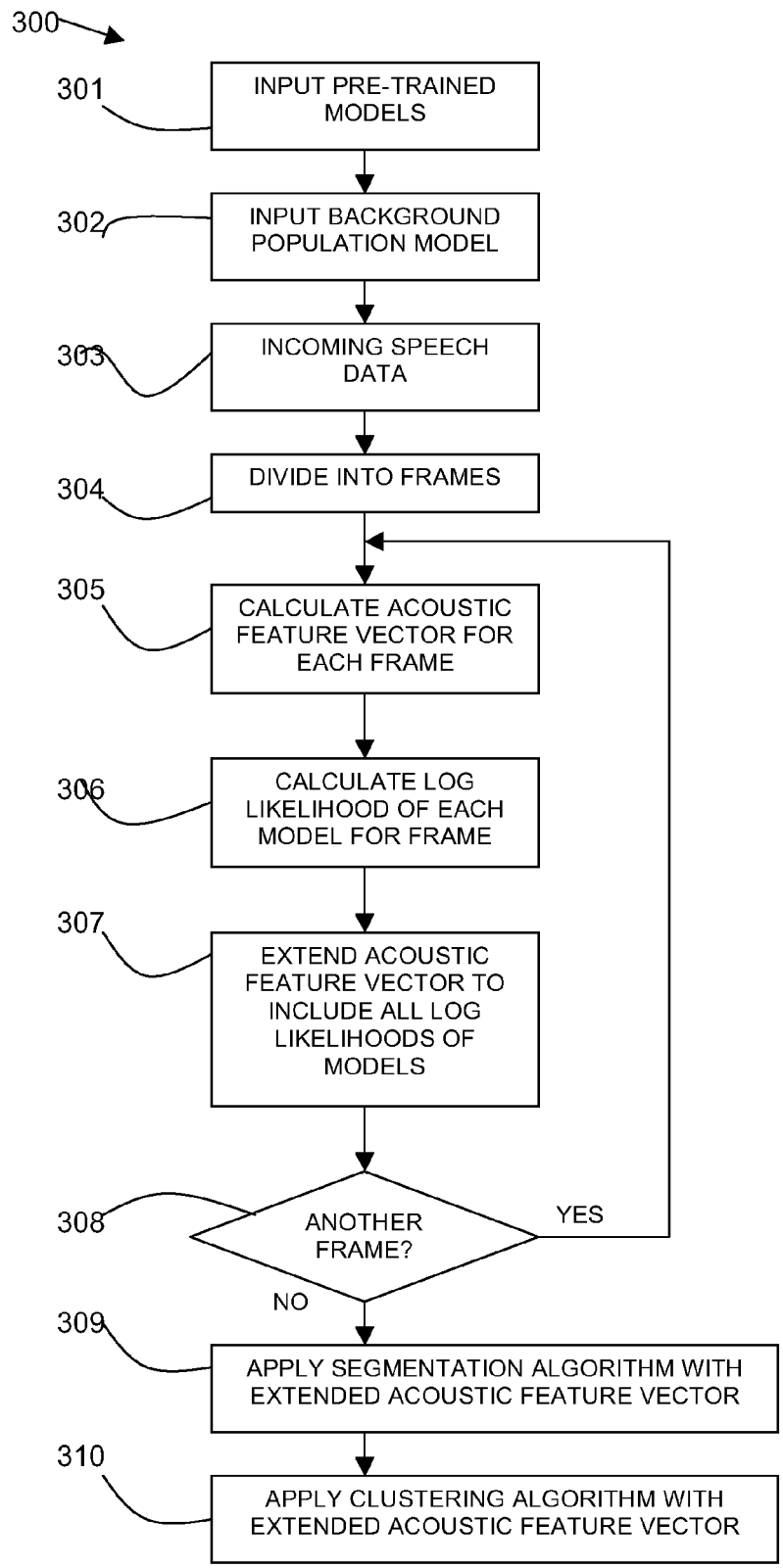
FIG. 3 a flow diagram of a method in accordance with the present invention.

Referring to FIG. 3, a flow diagram 300 shows the described method. A set of pre-trained models is available 301 for known speakers or known groups or categories of speakers. A background population model is available 302. Incoming speech data is received 303.

The incoming speech data is divided 304 into frames. For each frame an acoustic feature vector is created 305. For each frame a log-likelihood of the acoustic feature vector for each known speaker or group of speakers is calculated 306. The log-likelihoods for all the pre-trained models are incorporated 307 into an extended acoustic feature vector.

It is determined 308 if there is another frame, if so, the method loops to calculate the extended acoustic feature vector for the next frame.

When there are no more frames, the extended acoustic feature vectors for the frames are used by a segmentation algorithm 309 to find segments of speaker changes using statistical measures of distance between the distributions of the extended acoustic feature vectors. Resulting segments of the same speaker may be clustered by applying a clustering algorithm 310 using the extended acoustic feature vectors.

Figure 4:
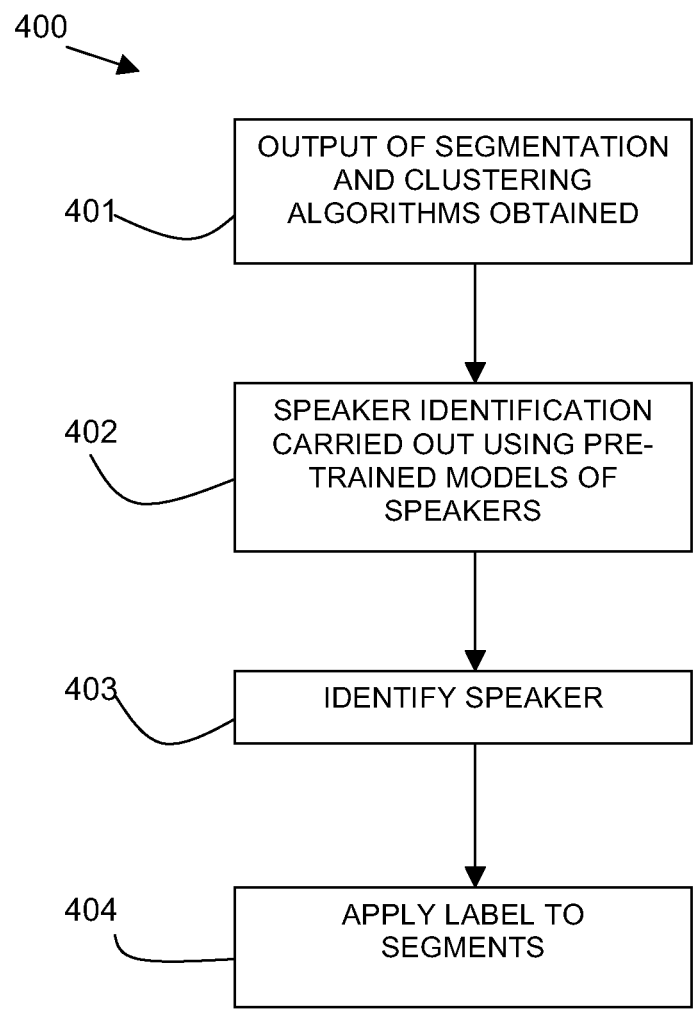
FIG. 4 is a flow diagram of a method of an aspect of the invention.

Referring to FIG. 4, a flow diagram 400 shows an optional labeling method using the pre-trained models.

The output of the segmentation and clustering algorithms is obtained 401. A speaker identification method is carried out 402 on segments of a cluster using the pre-trained models of speakers. A speaker is identified 403 and a label is provided 404 for the segments.

The extended acoustic feature vector instead of just representing the spectral characteristics of a time frame, also represents the probability that a frame is spoken by a person or one or a group used to model the probability.

For example, an acoustic feature vector may have 15 coefficients representing the spectral characteristics of a frame. In addition, 10 further coefficients may be added based on 10 models used for log-likelihood ratio calculations. The 10 models may be for 5 speakers, the group of male speakers, the group of female speakers, the group of foreign speakers, the group of noisy background, and the group of clear background.

The coefficients can be statistically compared between frames by the segmentation and clustering algorithms. The extension of the coefficients to include model based probabilities increases the accuracy of the segmentation and clustering algorithms.

A diarization system may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

I claim:

1. A computer program product for speaker diarization, the computer program product comprising:
  a non-transitory computer readable medium;
  computer program instructions operative to:
    obtain pre-trained acoustic models of individual speakers and/or groups of speakers;
    receive speech data with multiple speakers;
    divide the speech data into frames;
    for each of a plurality of frames, calculate for one or more of the pre-trained acoustic models, a probability that the speaker of the frame is the speaker of the pre-trained acoustic model;
    for each of the plurality of frames, determine an acoustic feature vector representing the frame;
    for each of the plurality of frames, modify the respective acoustic feature vector of the frame to include one or more elements representing the calculated respective one or more probabilities; and segmenting or clustering the received speech using the modified feature vectors of the plurality of frames, wherein said program instructions are stored on said computer readable medium.

2. The computer program product of claim 1, wherein the modified acoustic feature vector comprises an extended vector including added elements representing for respective pre-trained acoustic models, a probability that the speaker of the frame is the speaker of the respective pre-trained acoustic model.

3. The computer program product of claim 2, wherein each additional element in the extended vector of a frame comprises a log-likelihood ratio of the probability that the frame matches a respective pre-trained model in relation to a probability that the frame matches a background population model.

4. The computer program product of claim 1, wherein the computer program instructions are operative to segment the received speech using the modified feature vector.

5. The computer program product of claim 1, wherein the computer program instructions are operative to cluster the received speech using the modified feature vector.

6. A system for speaker diarization, comprising:
a processor;
a storage medium storing pre-trained acoustic models of individual speakers and/or groups of speakers;
a receiver for receiving speech data from multiple speakers; and
a computer processor configured to divide the speech data into frames,
determine for each of a plurality of frames a modified acoustic feature vector including elements representing for one or more of the pre-trained acoustic models, a probability that the speaker of the frame is the speaker of the pre-trained acoustic model, and segment or cluster the speech data using the modified feature vectors of the plurality of frames.

7. The system as claimed in claim 6, wherein the computer processor is configured to segment the frames using the modified acoustic feature vectors of the frames to identify change points in the speech data where the identity of the speaker changes.

8. The system as claimed in claim 7, wherein the computer processor is configured to cluster segments according to speaker's identities using the modified acoustic feature vectors of the frames.

9. The system as claimed in claim 6, wherein the computer processor is configured to calculate an acoustic feature vector for a frame based on spectral characteristics and a log-likelihood ratio of the frame for each pre-trained model in relation to a background population model; and to extend the acoustic feature vector to include coefficients of the log-likelihood ratios of the pre-trained models.

10. The system as claimed in claim 6, including a pre-training component for extracting a time series of mel-frequency cepstrum coefficients from an audio sample and modelling using a Gaussian Mixture Model.

11. The system as claimed in claim 6, wherein groups of speakers include a group of speakers having a common characteristic.

12. The system as claimed in claim 6, including a speaker identification component for applying speaker identification to clustered segments using the pre-trained models.

13. The system as claimed in claim 12, including a labeling component for labeling clustered segments according to a pre-trained model of an individual speaker.

14. The system of claim 6, wherein the modified acoustic feature vector comprises an extended vector including added elements representing for respective pre-trained acoustic models, a probability that the speaker of the frame is the speaker of the respective pre-trained acoustic model.

15. The system of claim 14, wherein each additional element in the extended vector of a frame comprises a log-likelihood ratio of the probability that the frame matches a respective pre-trained model in relation to a probability that the frame matches a background population model.

* * * * *